United States Patent
Chai et al.

(10) Patent No.: US 12,349,084 B2
(45) Date of Patent: Jul. 1, 2025

(54) METHOD AND DEVICE FOR SCHEDULING AND INFORMATION TRANSMISSION, RELATED APPARATUS, AND STORAGE MEDIUM

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Li Chai, Beijing (CN); Min Wu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 723 days.

(21) Appl. No.: 17/607,119

(22) PCT Filed: Apr. 26, 2020

(86) PCT No.: PCT/CN2020/087052
§ 371 (c)(1),
(2) Date: Oct. 28, 2021

(87) PCT Pub. No.: WO2020/221171
PCT Pub. Date: Nov. 5, 2020

(65) Prior Publication Data
US 2022/0232495 A1 Jul. 21, 2022

(30) Foreign Application Priority Data
Apr. 30, 2019 (CN) .......................... 201910364283.0

(51) Int. Cl.
*H04W 56/00* (2009.01)

(52) U.S. Cl.
CPC ................................ *H04W 56/001* (2013.01)

(58) Field of Classification Search
CPC ............. H04W 56/001; H04W 72/569; H04W 56/0015; H04W 72/0446; H04W 72/23; H04W 72/1268
See application file for complete search history.

(56) References Cited

U.S. PATENT DOCUMENTS

2015/0139071 A1* 5/2015 Wu .................. H04W 56/0015
370/324
2019/0020463 A1 1/2019 Xu et al.
(Continued)

FOREIGN PATENT DOCUMENTS

CN 103124429 A 5/2013
CN 109392148 A 2/2019
(Continued)

OTHER PUBLICATIONS

"TSN evaluations for IIoT requirements", Jan. 2019, Source: Intel Corporation, 3GPP TSG RAN WG1 Ad-Hoc Meeting 1901, R1-1901334, Taipei, Taiwan, 10 pgs.
(Continued)

*Primary Examiner* — Kyaw Z Soe
(74) *Attorney, Agent, or Firm* — Cooper Legal Group, LLC

(57) ABSTRACT

Disclosed are a method and device for scheduling and transmission, a terminal, a communication node, and a storage medium. The method comprises: a first communication node acquiring clock information; and sending m types of clock information to a terminal on the basis of the acquired clock information, where m is greater than or equal to 1.

20 Claims, 4 Drawing Sheets

(56) References Cited

U.S. PATENT DOCUMENTS

| | | | |
|---|---|---|---|
| 2019/0123843 A1* | 4/2019 | Bush | H04J 3/0697 |
| 2019/0123847 A1 | 4/2019 | Bush et al. | |
| 2020/0083978 A1 | 3/2020 | Bush et al. | |
| 2022/0182165 A1* | 6/2022 | Sha | H04J 3/0685 |

FOREIGN PATENT DOCUMENTS

| | | |
|---|---|---|
| EP | 3419230 A1 | 12/2018 |
| EP | 3952467 A1 | 2/2022 |
| WO | 2018204683 A1 | 11/2018 |
| WO | 2020192784 A1 | 10/2020 |

OTHER PUBLICATIONS

"Study on NR Industrial Internet of Things (IoT)", Mar. 2019, 3GPP, TR 38.825 v16.0.0, 3rd Generation Partnership Project; Technical Specification Group Radio Access Network; (Release 16), 32 pgs.
International Search Report in the international application No. PCT/CN2020/087052, mailed on Jul. 27, 2020, 3 pgs.
English translation of the Written Opinion of the International Search Authority in the international application No. PCT/CN2020/087052, mailed on Jul. 27, 2020, 6 pgs.
Office Action of the Indian application No. 202117052135, issued on May 13, 2022, 7 pgs.
"Scheduling Enhancement for TSN Traffic", Nov. 2018, 3GPP TSG-RAN WG2 Meeting #104. R2-1818358, Source LG Electronics Inc., Spokane, USA, 2 pgs.
"Scheduling Enhancements for TSN Traffic", Nov. 2018, 3GPP TSG-RAN WG2 #104, R2-1818122, Source: CMCC, Spokane, USA, 7 pgs.
"Scheduling Enhancements for TSN Traffic", Apr. 2019, 3GPP TSG-RAN WG2 Meeting #105bis, R2-1903801, Source: Spreadtrum Communications, Xi'an, China, 2 pgs.
"Scheduling Enhancements for TSN Traffic Patterns", Oct. 2018, 3GPP TSG-RAN WG2 #103bis, Tdoc R2-1814815, Source: Ericsson, Chengdu, China, 8th, 2 pgs.
"Time Synchronisation for IIOT" Nov. 2018, 3GPP TSG-RAN WG2 #104, R2-1818254, Spoken, USA, Source: NTT DOCOMO, Inc., 10 pgs.
"Time Synchronization for IIoT", Nov. 2018, 3GPP TSG-RAN WG2 #104, R2-1817247, Spokane, United States, Source: OPPO, 3 pgs.
Evaluation on TSN Requirements, Jan. 2019, 3GPP TSG RAN WG1, Ad-Hoc Meeting 1901, R1-1901252, Taipei, Source: Huawei, HiSilicon, 13 pgs.
Supplementary European Search Report in the European application No. 20798700.9, mailed on Dec. 6, 2022, 10 pgs.
Second Office Action of the Australian application No. 2020265628, issued on Jan. 27, 2023, 4 pgs.

* cited by examiner

METHOD AND DEVICE FOR SCHEDULING AND INFORMATION TRANSMISSION, RELATED APPARATUS, AND STORAGE MEDIUM

CROSS-REFERENCE TO RELATED APPLICATIONS

This is a national phase application of International Application No. PCT/CN2020/087052, filed on Apr. 26, 2020, which is based upon and claims priority to Chinese Patent Application No. 201910364283.0, filed on Apr. 30, 2019. The disclosures of International Application No. PCT/CN2020/087052 and Chinese Patent Application No. 201910364283.0 are hereby incorporated by reference in their entireties.

TECHNICAL FIELD

The disclosure relates to the field of wireless communications, and in particular to a scheduling and information transmission method and apparatus, a related device, and a storage medium.

BACKGROUND

In order to promote the development of the Industrial Internet of Things (IIoT), a Time Sensitive Network (TSN) is created to establish a "general" time sensitive mechanism for Ethernet protocols to ensure the time certainty of network data transmission.

When a TSN service passes through a mobile communication network, how to select a logical channel to ensure the utilization ratio of radio resource resources and the performance of User Equipment (UE) running services is an urgent problem to be solved.

SUMMARY

To solve the related technical problems, embodiments of the disclosure provide a scheduling and information transmission method and apparatus, a related device, and a storage medium.

A technical solution in the embodiments of the disclosure is implemented as follows.

The embodiments of the disclosure provide an information transmission method, which is applied to a first communication node, and may include the following operations.

Clock information is acquired.

m types of clock information are sent to a terminal based on the acquired clock information, where m is greater than or equal to 1.

In the above solution, the operation that the clock information is acquired may include at least one of the following:

clock information is acquired from a core network;
clock information is acquired from an adjacent communication node;
clock information sent by the terminal is received;
capability information reported by the terminal is received, the capability information indicating clock related capability supported by the terminal; or
clock information is acquired from a specific network system.

In the above solution, the capability information includes at least one of the following:

a clock type supported by the terminal; or
at least one of synchronization precision information or synchronization granularity information supported by the terminal.

In the above solution, the clock information sent by the terminal includes: clock information of a system to which the terminal is being connected.

In the above solution, the clock information includes at least one of the following:

time information of Universal Time Coordinated (UTC);
an offset between the UTC and GPS;
information about a relationship between Daylight Saving Time (DST) and local time;
an offset between the UTC and the local time;
an offset between the UTC and a specific network;
a mapping relationship between the UTC and a System Frame Number (SFN);
indication information about whether the clock is a master clock;
level information of the clock;
information about an offset with respect to a reference time of a specific clock type;
synchronization precision information of the clock;
synchronization granularity information of the clock;
synchronization inaccuracy information;
type information of the clock;
reference time information;
position relationship indication information of the reference time information and a received signaling; or
time update period information of the clock.

In the above solution, the reference time information includes at least one of the following:

reference system radio frame information;
reference subframe information;
reference slot information; and
reference time symbol information.

The embodiments of the disclosure also provide an information transmission method. The method is applied to a terminal, and may include the following operations.

At least one of capability information or clock information is sent to a first communication node. The capability information indicates clock related capability supported by the terminal.

m types of clock information sent by the first communication node are received, where m is greater than or equal to 1.

In the above solution, the capability information includes at least one of the following:

a clock type supported by the terminal; or
at least one of synchronization precision information or synchronization granularity information supported by the terminal.

In the above solution, the sent clock information includes clock information of a system to which the terminal is being connected.

In the above solution, the clock information includes at least one of the following:

time information of UTC;
an offset between the UTC and GPS;
information about a relationship between DST and local time;
an offset between the UTC and the local time;
an offset between the UTC and a specific network;
a mapping relationship between the UTC and an SFN;
indication information about whether the clock is the master clock;
level information of the clock;

information about an offset with respect to a reference time of a specific clock type;
synchronization precision information of the clock;
synchronization granularity information of the clock;
synchronization inaccuracy information;
type information of the clock;
reference time information;
position relationship indication information of the reference time information and a received signaling; or
time update period information of the clock.

In the above solution, the reference time information includes at least one of the following:
reference system radio frame information;
reference subframe information;
reference slot information; or
reference time symbol information.

The embodiments of the disclosure also provide a scheduling method. The method is applied to a terminal, and may include the following operations.

First information sent by the first communication node is received, the first information including at least one granted radio resource.

Time information of an on duration and a suspended duration of at least one granted radio resource is acquired.

At least one granted radio resource is selected for at least one logical channel.

At least one of specific logical channel data or signaling is sent or received on an available resource indicated by the time information of the on duration of the granted radio resource.

In the above solution, the operation that at least one granted radio resource is selected for at least one logical channel may include the following actions.

At least one granted radio resource is selected for at least one logical channel based on at least one of the following information:
time information of a service corresponding to the at least one logical channel; a logical channel selection result of a data packet cached by the at least one logical channel; or fourth information, the fourth information representing at least one corresponding granted radio resource configured by each logical channel and/or a Radio Network Temporary Identifier (RNTI) configured by at least one logical channel; and
sending or reception of at least one of data or signaling on a resource indicated by the time information of the suspended duration of the granted radio resource is stopped.

In the above solution, when the time information of the on duration and the suspended duration of each granted radio resource is acquired, the method may include the following operation.

The time information of the on duration and the time information of the suspended duration of the corresponding granted radio resource that is configured through Radio Resource Control (RRC) dedicated signaling is received.

The embodiments of the disclosure also provide an information transmission method. The method is applied to a first communication node, and may include the following operation.

Time information of an on duration and time information of a suspended duration of a corresponding granted radio resource is configured for a terminal through RRC dedicated signaling.

The embodiments of the disclosure also provide a scheduling method. The method is applied to a terminal, and may include the following operations.

Configuration information of at least one set of configured grant that a first communication node configures for a used traffic pattern is received.

An offset sent by the first communication node is received.

An offset of a configured grant resource is updated with the received offset.

In the above solution, the operation that the offset sent by the first communication node is received may include the following action.

The offset sent by the first communication node is received through Downlink Control Information (DCI).

The embodiments of the disclosure also provide a scheduling method. The method is applied to a first communication node, and may include the following operations.

A traffic pattern used by the terminal is acquired.

At least one set of configured grant for the used traffic pattern is configured for the terminal.

An offset is sent to the terminal, the sent offset being used for the terminal to update an offset of a configured grant resource.

In the above solution, the operation that the traffic pattern used by the terminal is acquired may include one of the following:
the traffic pattern used by the terminal is acquired from the core network; and
the traffic pattern used by the terminal is acquired from the terminal.

In the above solution, the operation that the offset is sent to the terminal may include the following action.

The offset is sent to the terminal through DCI.

The embodiments of the disclosure also provide a scheduling method. The method is applied to a terminal, and may include the following operations.

Time information of a service corresponding to at least one logical channel is determined.

First information sent by a first communication node is received, the first information including a granted radio resource.

At least one logical channel is selected for the granted radio resource based on the time information of the service corresponding to the at least one logical channel and configuration parameters of the at least one logical channel.

In the above solution, the operation that the at least one logical channel is selected for the granted radio resource based on the time information of the service corresponding to the at least one logical channel and configuration parameters of the at least one logical channel may include the following action.

When a priority of a first logical channel corresponding to a first data packet is lower than that of a second logical channel corresponding to a second data packet, and a time characteristic of the granted radio resource matches better with a time characteristic represented by time information corresponding to the first logical channel, the first data packet corresponding to the first logical channel is preferentially scheduled with the granted radio resource;

or, when the priority of the first logical channel corresponding to the first data packet is the same as that of the second logical channel corresponding to the second data packet, and the time characteristic of the granted radio resource matches better with the time characteristic represented by the time information corresponding to the first logical channel, the first data packet corresponding to the first logical channel is preferentially scheduled with the granted radio resource.

In the above solution, the operation that the at least one logical channel is selected for the granted radio resource based on the time information of the service corresponding to the at least one logical channel and configuration parameters of the at least one logical channel may include the following action.

A data packet corresponding to at least one specific logical channel and preferentially scheduled with the granted radio resource is determined according to a first weight and third information.

The first weight is a predefined weight or a weight of a matching degree, indicated by the first communication node, between time characteristic of the granted radio resource and time characteristic represented by the time information corresponding to the corresponding logical channel.

The third information includes at least one of the following information:
  a priority of logical information;
  a subcarrier spacing; or
  a duration of a Physical Uplink Shared Channel (PUSCH).

In the above solution, the granted radio resource includes at least one of the following:
  a dynamically scheduled granted radio resource;
  a Configured Grant (CG) radio resource; or
  a semi-persistent scheduling (SPS) radio resource.

In the above solution, the time information of the service corresponding to the logical channel includes at least one of the following:
  clock information of the service corresponding to the logical channel; or
  time characteristic information of the service corresponding to the logical channel.

In the above solution, the time characteristic information includes at least one of the following:
  sending time information of a data packet;
  arrival time information of the data packet;
  sending period information of the data packet;
  sending duration information of the data packet in a period;
  length information of the data packet;
  duration information of the data packet residing in a cache;
  survival time information of the data packet;
  sending state information of the first n data packets of the data packet, where n is a positive integer;
  a delay requirement of the data packet;
  a value of k in Hybrid Automatic Repeat Request (HARQ) timing of the data packet;
  a reliability requirement of the data packet;
  an RNTI for scheduling and matching of the data packet; or
  a transmit power requirement of the data packet.

In the above solution, when the time information of the service corresponding to each logical channel is determined, the method includes at least one of the following operations.

The time information of the service corresponding to the corresponding logical channel is received from the first communication node.

The time information of the service corresponding to the corresponding logical channel is determined according to the learned time characteristic information of the service corresponding to the logical channel.

In the above solution, the time information of the service corresponding to the corresponding logical channel is received from the first communication node through one of the following signaling:
  DCI of a Uplink (UL) grant;
  DCI of Downlink (DL) scheduling;
  RRC signaling carrying grand information of UL configuration;
  signaling carrying SPS information of DL configuration;
  RRC signaling carrying configuration information of the logical channel; and
  RRC signaling carrying absolute time information.

In the above solution, the operation that the time information of the service corresponding to the at least one logical channel is determined may include the following action.

Second information is received through one of the following signaling:
  DCI of a UL grant;
  DCI of DL scheduling;
  RRC signaling carrying grand information of UL configuration;
  a signaling carrying SPS information of DL configuration;
  RRC signaling carrying configuration information of the logical channel; and
  RRC signaling carrying absolute time information;
  The time information of the service corresponding to the logical channel is determined by using the second information.

The second information represents at least one of the following:
  an indicated resource is aligned with a specific clock boundary or has a minimum offset from the specific clock boundary; or
  a period of the indicated resource has a multiple relationship with a period of the specific clock, or an offset of a period value of the indicated resource is the minimum.

In the above solution, the method may further include the following operation.

The time information of the service corresponding to at least one logical channel is updated.

In the above solution, when the time information of the service corresponding to the logical channel is updated, the method may include the following operations.

Updated time-related information sent by the first communication node is received.

The time information of the service corresponding to the corresponding logical channel is updated by using the received updated time-related information.

In the above solution, the updated time-related information sent by the first communication node is received through one of the following signaling:
  tRRC signaling; and
  a Media Access Control (MAC) Control Element (CE).

In the above solution, the time-related information includes at least one of the following:
  clock information; or
  a delta value of an offset between the time in the previous clock information and reference time.

In the above solution, the time information of the service corresponding to the logical channel includes at least one of the following:
  time information of UTC;
  an offset between the UTC and GPS;
  information about the relationship between DST and local time;
  an offset between the UTC and the local time;
  an offset between the UTC and a specific network;
  a mapping relationship between the UTC and an SFN;

indication information about whether the clock is a master clock;
level information of the clock;
information about an offset with respect to reference time of a specific clock type;
synchronization precision information of the clock;
synchronization granularity information of the clock;
synchronization inaccuracy information;
type information of the clock;
reference time information;
the position relationship indication information of the reference time information and a received signaling; or
time update period information of the clock.

In the above solution, the reference time information includes at least one of the following:
reference system radio frame information;
reference subframe information;
reference slot information; or
reference time symbol information.

The embodiments of the disclosure also provide an information transmission method. The method is applied to a first communication node, and may include one of the following operations.

Time information of a service corresponding to a corresponding logical channel is sent to a terminal.

Second information is sent to the terminal. The second information represents at least one of the following:
an indicated resource is aligned with a specific clock boundary or has the minimum offset from the specific clock boundary; or
a period of the indicated resource has a multiple relationship with a period of a specific clock, or an offset of the period value of the indicated resource is the minimum.

In the above solution, the corresponding information is sent through one of the following signaling:
DCI of a UL grant;
DCI of DL scheduling;
RRC signaling carrying grand information of UL configuration;
a signaling carrying SPS information of DL configuration;
RRC signaling carrying configuration information of the logical channel; and
RRC signaling carrying absolute time information.

In the above solution, the method may further include the following operation.

Updated time-related information is sent to the terminal.

The embodiments of the present disclosure also provide an information transmission apparatus, which may include a second acquiring unit and a third sending unit.

The second acquiring unit is configured to acquire clock information.

The third sending unit is configured to send m types of clock information to the terminal based on the acquired clock information, where m is greater than or equal to 1.

The embodiments of the present disclosure also provide an information transmission apparatus, which may include a fourth sending unit and a fourth receiving unit.

The fourth sending unit is configured to send at least one of capability information or clock information to a first communication node, the capability information indicating clock related capability supported by the terminal; and The fourth receiving unit is configured to receive m types of clock information sent by the first communication node, where m is greater than or equal to 1.

The embodiments of the present disclosure also provide a scheduling apparatus, which may include a second receiving unit, an acquiring unit, a second determining unit and a transmitting unit.

The second receiving unit is configured to receive first information sent by a first communication node, the first information including at least one granted radio resource.

The acquiring unit is configured to acquire time information of an on duration and a suspended duration of the at least one granted radio resource.

The second determining unit is configured to select at least one granted radio resource for at least one logical channel.

The transmitting unit is configured to send or receive at least one of specific logical channel data or signaling on an available resource indicated by the time information of the on duration of the granted radio resource.

In the above solution, the transmitting unit is further configured to stop sending or receiving at least one of data or signaling on a resource indicated by the time information of the suspended duration of the granted radio resource.

The embodiments of the disclosure also provide an information transmission apparatus, which may include a second sending unit.

The second sending unit is configured to configure time information of an on duration and time information of a suspended duration of the corresponding granted radio resource for a terminal through RRC dedicated signaling.

The embodiments of the present disclosure also provide a scheduling apparatus, which may include a third receiving unit and a processing unit.

The third receiving unit is configured to receive configuration information of at least one set of configured grant that a first communication node configures for a used traffic pattern, and receive an offset sent by the first communication node.

The processing unit is configured to update an offset of the configured grant resource with the received offset.

The embodiments of the present disclosure also provide a scheduling method, which may include a first acquiring unit, a configuring unit and an updating unit.

The first acquiring unit is configured to acquire a traffic pattern used by the terminal.

The configuring unit is configured to configure for the terminal at least one set of configured grant for the used traffic pattern.

The updating unit is configured to send an offset to the terminal, the sent offset being used for the terminal to update an offset of the configured grant resource.

The embodiments of the present disclosure also provide a scheduling apparatus, which may include a first determining unit, a first receiving unit and a first selecting unit.

The first determining unit is configured to determine time information of a service corresponding to at least one logical channel.

The first receiving unit is configured to receive first information sent by a first communication node, the first information including a granted radio resource.

The first selecting unit is configured to select at least one logical channel for the granted radio resource based on the time information of the service corresponding to the at least one logical channel and configuration parameters of the at least one logical channel.

In the above solution, the first determining unit is further configured to update the time information of the service corresponding to the at least one logical channel.

The embodiments of the disclosure also provide an information transmission apparatus, which may include a first sending unit.

The first sending unit is configured to:
send time information of a service corresponding to a corresponding logical channel to a terminal; or,
send second information to the terminal. The second information represents at least one of the following:
an indicated resource is aligned with a specific clock boundary or has the minimum offset from the specific clock boundary; or
a period of the indicated resource has a multiple relationship with a period of a specific clock, or an offset of a period value of the indicated resource is the minimum.

The embodiments of the disclosure also provide a terminal, which may include a first communication interface and a first processor.

The first communication interface is configured to receive configuration information of at least one set of configured grant that a first communication node configures for a used traffic pattern, and receive an offset sent by the first communication node. The first processor is configured to update an offset of the configured grant resource with the received offset.

Or,
the first communication interface is configured to send at least one of capability information or clock information to the first communication node, the capability information indicating clock related capability supported by the terminal, and receive m types of clock information sent by the first communication node, where m is greater than or equal to 1.

The embodiments of the disclosure also provide a communication node, which may include a second communication interface and a second processor.

The second processor is configured to acquire a traffic pattern used by a terminal, and configure for the terminal at least one set of configured grant for the used traffic pattern through the second communication interface; the second communication interface is configured to send an offset to the terminal, the sent offset being used for the terminal to update an offset of a configured grant resource.

Or,
the second communication interface is configured to acquire clock information, and send m types of clock information to the terminal based on the acquired clock information, where m is greater than or equal to 1.

The embodiments of the present disclosure also provide a terminal, which may include a first processor and a first communication interface.

The first processor is configured to determine time information of a service corresponding to at least one logical channel.

The first communication interface is configured to receive first information sent by a first communication node, the first information including a granted radio resource.

The first processor is further configured to select at least one logical channel for the granted radio resource based on the time information of the service corresponding to the at least one logical channel and configuration parameters of the at least one logical channel.

In the above solution, the first processor is further configured to update the time information of the service corresponding to at least one logical channel.

The embodiments of the disclosure also provide a communication node, which may include a second processor and a second communication interface.

The second communication interface is configured to:
send time information of a service corresponding to a corresponding logical channel to a terminal under control of the second processor;
or, send second information to the terminal under the control of the second processor. The second information represents at least one of the following:
an indicated resource is aligned with a specific clock boundary or has the minimum offset from the specific clock boundary; or
a period of the indicated resource has a multiple relationship with a period of the specific clock, or an offset of a period value of the indicated resource is the minimum.

The embodiments of the present disclosure also provide a terminal, which may include a first communication interface and a first processor.

The first communication interface is configured to receive first information sent by a first communication node, the first information including at least one granted radio resource.

The first processor is configured to acquire time information of an on duration and a suspended duration of the at least one granted radio resource, and select at least one granted radio resource for at least one logical channel.

The first communication interface is further configured to send or receive at least one of specific logical channel data or signaling on an available resource indicated by the time information of the on duration of the granted radio resource.

In the above solution, the first communication interface is further configured to stop sending or receiving at least one of data or signaling on the resource indicated by the time information of the suspended duration of the granted radio resource.

The embodiments of the disclosure also provide a communication node, which may include a second processor and a second communication interface.

The second processor is configured to configure, by using the second communication interface, time information of an on duration and time information of a suspended duration of the corresponding granted radio resource for the terminal through RRC dedicated signaling.

The embodiments of the disclosure also provide a terminal, which may include a first processor and a first memory configured to store a computer program capable of running in the processor.

The first processor is configured to, when running the computer program, execute the operations of any method for the terminal side.

The embodiments of the disclosure also provide a communication node, which may include a second processor and a second memory configured to store a computer program capable of running in the processor.

The second processor is configured to, when running the computer program, execute the operations of any method for the first communication node side.

The embodiments of the disclosure also provide a storage medium having a computer program stored thereon. When executed by the processor, the computer program implements the operations of any method for the terminal side, or implements the operations of any method for the first communication node side.

With the scheduling and information transmission method and apparatus, the related device and the storage medium provided by the embodiments of the disclosure, the terminal determines the time information of the service corresponding to at least one logical channel, receives the first information sent by the first communication node, the first information including the granted radio resource, and selects at least one logical channel for the granted radio resource based on the time information of the service corresponding to at least one logical channel in combination with the configuration parameters of at least one logical channel. The logical channel is selected by using the time information of the service, which improves the accuracy of logical channel selection, and fully ensures the utilization ratio of radio resources and the performance of a terminal running services.

DETAILED DESCRIPTION

The disclosure is further described below in combination with the accompanying drawings and embodiments.

In the related art, a TSN supports real-time control and synchronization, for example, between sport applications and robots, through the Ethernet. The TSN may also support other data communications common in manufacturing applications, which promotes convergence between Information Technology (IT) and Operation Technology (OT). The TSN will bring a world of smarter, virtually-connected devices and infrastructure. Although a plurality of data collected by an industrial sensor and a control system in the IIoT is not time-sensitive, there is a mass of mission-critical, time-sensitive data that must be transmitted and shared within the strict range of delay and reliability. For a general clock used for transmission time scheduling, delay regulation, reserved bandwidth and redundancy configuration, such a requirement for the TSN enables the TSN to ensure the precision of time synchronization and thus support the synchronization of multiple data streams.

When a TSN service does not pass through a network cables, but through a fifth generation mobile communication technology (5G) system, the 5G system is connected with multiple TSNs, each TSN system has its own clock, and the 5G system also has a clock based on the Global Navigation Satellite System (GNSS) Timing of a wireless network for mobile communications mostly relies on the clock based on the GNSS, so a base station can only obtain the clock based on the GNSS, but not a clock of the TSN, and cannot schedule the TSN service based on the clock of the TSN. Thus, the utilization ratio of radio resources and the performance of UE running services cannot be ensured. The GNSS refers to all satellite navigation systems, including the global, regional and enhanced satellite navigation systems, such as the Global Positioning System (GPS) of the United States and the Beidou navigation satellite system of China, and related augmentation systems, such as the Wide Area Augmentation System (WAAS) of the United States, the European Geostationary Navigation Overlay System (EGNOS) of Europe and the Multi-functional Satellite Augmentation System (MSAS) of Japan, and also covers other satellite navigation systems being built and to be built in future.

Based on this, in the embodiments of the disclosure, when selecting a logical channel, a terminal considers both a service characteristic and corresponding reference time information to make the time information corresponding to the service become a reference element for resource selection.

With the solution of the embodiments of the disclosure, the terminal uses time information of a service to select a logical channel, which improves the accuracy of logical channel selection and fully ensures the utilization ratio of radio resources and the performance of the terminal running services.

Figure 1:
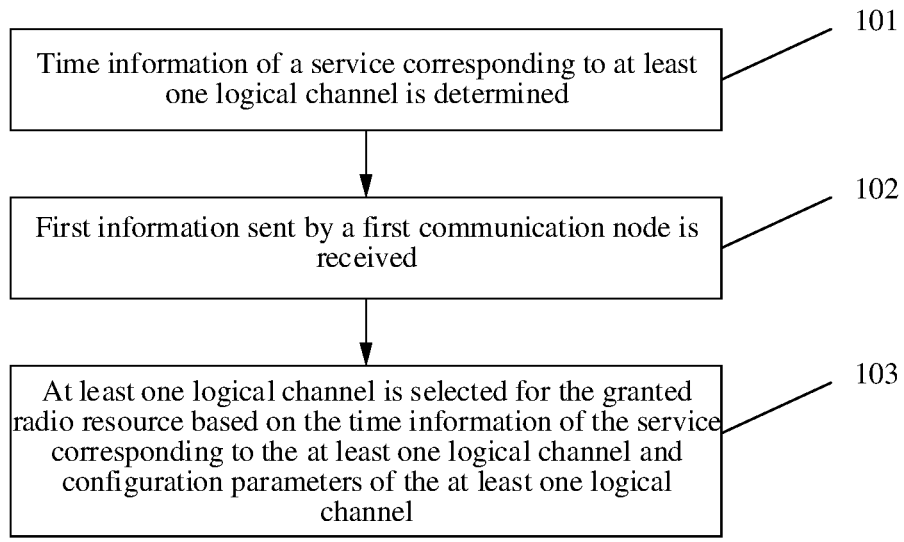
FIG. 1 is a flowchart of a scheduling method according to an embodiment of the disclosure.

The embodiments of the disclosure provide a scheduling method, which is applied to a terminal. As shown in FIG. 1, the method may include the following operations.

In 101, time information of a service corresponding to at least one logical channel is determined.

In 102, first information sent by a first communication node is received.

The first information includes a granted radio resource.

In 103, at least one logical channel is selected for the granted radio resource based on the time information of the service corresponding to the at least one logical channel and configuration parameters of the at least one logical channel.

The time information of the service corresponding to the logical channel may include at least one of the following information:

clock information of the service corresponding to the logical channel; or time characteristic information of the service corresponding to the logical channel.

The time characteristic information includes at least one of the following:

sending time information of a data packet;

arrival time information of the data packet;

sending period information of the data packet;

sending duration information of the data packet in a period;

length information of the data packet;

duration information of the data packet residing in a cache;

survival time information of the data packet;

sending state information of the first n data packets of the data packet, where n is a positive integer;

a delay requirement of the data packet;

a value of k in HARQ timing of the data packet;

a reliability requirement of the data packet;

an RNTI for scheduling and matching of the data packet; or a transmit power requirement of the data packet.

The survival time information of the data packet refers to that if the Pth data packet received by a base station is wrong, and the correct (P+1)th data packet is not received within the survival time, the connection is considered to be unavailable.

The sending state information includes at least one of the following:

HARQ feedback information (ACK or NACK);

feedback information (ACK or NACK) of an Automatic Repeat Request (ARQ) in a Radio Link Control (RLC) layer; or information regarding whether a discard timer of a Packet Data Convergence Protocol (PDCP) corresponding to the first n data packets expires.

k in the HARQ timing indicates a delay between reception of a downlink (DL) grant and reception of DL data, a delay between reception of the DL data and reception of the corresponding HARQ feedback, a delay between sending of an uplink (UL) grant and sending of UL data, or a delay between reception of the HARQ feedback and UL retransmission. In practical applications, k0 and k1 are used for representing different delays.

The reliability requirement of the data packet refers to that a packet error rate is lower than a certain threshold.

In an embodiment, when the time information of the service corresponding to each logical channel is determined, the method may include at least one of the following operations.

The time information of the service corresponding to the corresponding logical channel is received from the first communication node.

The time information of the service corresponding to the corresponding logical channel is determined according to the learned time characteristic information of the service corresponding to the logical channel.

The learned time characteristic information of the service corresponding to the logical channel may refer to the time characteristic information of the service corresponding to the logical channel learned according to historical time characteristic information of a service corresponding to a logical channel.

In practical applications, the terminal may receive the time information of the service corresponding to the corresponding logical channel from the first communication node through one of the following signaling:
  DCI of an uplink grant;
  DCI of DL scheduling;
  RRC signaling carrying grand information of UL configuration;
  a signaling carrying semi-persistent scheduling (SPS) information of DL configuration;
  RRC signaling carrying configuration information of the logical channel; and
  RRC signaling carrying absolute time information.

The DCI of UL grant is used for scheduling a UL resource; correspondingly, the DCI of DL scheduling is used for scheduling a DL resource.

The first communication node may directly send the time information of the service corresponding to the corresponding logical channel to the terminal, that is, the terminal may directly obtain the time information of the service corresponding to the corresponding logical channel. In practical applications, the terminal may also implicitly determine the time information of the service corresponding to the corresponding logical channel according to the information sent by the first communication node.

Based on this, in an embodiment, the operation that the time information of the service corresponding to at least one logical channel is determined may include the following actions.

Second information is received. The second information represents at least one of the following: an indicated resource is aligned with a specific clock boundary or has a minimum offset from the specific clock boundary; or, the period of the indicated resource has a multiple relationship with the period of the specific clock, or an offset of a period value of the indicated resource is the minimum.

The time information of the service corresponding to the logical channel is determined by using the second information.

That is, the second information implicitly indicates the time information of the service corresponding to the corresponding logical channel.

In practical applications, the terminal may receive the second information through one of the following signaling:
  DCI of a UL grant;
  DCI of DL scheduling;
  RRC signaling carrying grand information of UL configuration;
  a signaling carrying SPS information of DL configuration;
  RRC signaling carrying configuration information of the logical channel; and
  RRC signaling carrying absolute time information.

In practical applications, the time information of the service corresponding to the corresponding logical channel may be updated.

Based on this, in an embodiment, the method may further include the following operation.

The time information of the service corresponding to at least one logical channel is updated.

In practical applications, the process of updating the time information may be triggered by the first communication node or the terminal.

The time information of the service corresponding to at least one logical channel may be updated according to time-related information sent by the first communication node.

Based on this, in an embodiment, when the time information of the service corresponding to the logical channel is updated, the method may include the following operations.

Updated time-related information sent by the first communication node is received.

The time information of the service corresponding to the corresponding logical channel is updated by using the received updated time-related information.

In practical applications, the updated time-related information sent by the first communication node may be received through one of the following signaling: RRC signaling or a media access control (MAC) control element (CE).

In an embodiment, the time-related information may include at least one of the following: clock information or a delta value of an offset between the previous clock information and reference time.

The delta value may also be understood as an offset value.

In practical applications, the time information of the service corresponding to the logical channel includes at least one of the following:
  time information of Universal Time Coordinated (UTC);
  an offset between the UTC and GPS;
  information about a relationship between Daylight Saving Time (DST) and local time;
  an offset between the UTC and the local time;
  an offset between the UTC and a specific network (for example, the TSN);
  a mapping relationship between the UTC and a System Frame Number (SFN);
  indication information about whether the clock is a master clock;
  level information of the clock;
  information about the offset between the time information of the service corresponding to the logical channel and reference time of a specific clock type;
  synchronization precision information of the clock;

synchronization granularity information of the clock;
synchronization inaccuracy information;
type information of the clock;
reference time information;
position relationship indication information of the reference time information and the received signaling; or
time update period information of the clock.

For the level information of the clock, the closer the clock is to the master clock, the lower the level and the higher the precision.

The reference time information includes at least one of the following:
reference system radio frame information;
reference subframe information;
reference slot information; or
reference time symbol information.

The position relationship indication information of the reference time information and the received signaling carrying the time-related information refers to that the reference information precedes or follows the received signaling carrying the time-related information.

In practical applications, the first communication node may send the clock information by separately sending information of each clock domain, or sending the common part of the clock information of multiple clock domains and the differential information of each clock domain.

In practical applications, the granted radio resource may include at least one of the following:
a dynamically scheduled granted radio resource;
a configured grant (CG) radio resource; or
an SPS radio resource.

In practical applications, the first communication node may be a base station, a core network element, or an adaptive functional body of a core network and a perimeter network, etc.

In an embodiment, the specific implementation of the operation in 103 may include one of the following.

When a priority of a first logical channel corresponding to a first data packet is lower than that of a second logical channel corresponding to a second data packet, and a time characteristic of the granted radio resource matches better with a time characteristic represented by the time information corresponding to the first logical channel, the first data packet corresponding to the first logical channel is preferentially scheduled by using the granted radio resource.

When the priority of the first logical channel corresponding to the first data packet is the same as that of the second logical channel corresponding to the second data packet, and the time characteristic of the granted radio resource matches better with the time characteristic represented by the time information corresponding to the first logical channel, the first data packet corresponding to the first logical channel is preferentially scheduled by using the granted radio resource.

In practical applications, when the priority of the first logical channel corresponding to the first data packet is higher than that of the second logical channel corresponding to the second data packet, and the time characteristic of the granted radio resource matches better with the time characteristic represented by the time information corresponding to the first logical channel, the first data packet corresponding to the first logical channel is preferentially scheduled by using the granted radio resource.

From another perspective, the specific implementation of the operation in 103 may also include the following.

A data packet corresponding to at least one logical channel and preferentially scheduled with the granted radio resource is determined according to a first weight and third information.

The first weight is a predefined weight or a weight of a matching degree, indicated by the first communication node, between the time characteristic of the granted radio resource and the time characteristic represented by the time information corresponding to the corresponding logical channel.

The third information includes at least one of the following information:
a priority of logical information;
a subcarrier spacing; and
a duration of a Physical Uplink Shared Channel (PUSCH).

In the above process, the operation for the first communication node side includes one of the following.

The time information of the service corresponding to the corresponding logical channel is sent to the terminal.

The second information is sent to the terminal. The second information represents at least one of the following: an indicated resource is aligned with a specific clock boundary or has a minimum offset from the specific clock boundary; or, the period of the indicated resource has a multiple relationship with the period of the specific clock, or the offset of the period value of the indicated resource is the minimum.

In an embodiment, the corresponding information is sent through one of the following signaling:
DCI of a UL grant;
DCI of DL scheduling;
RRC signaling carrying grand information of UL configuration;
a signaling carrying SPS information of DL configuration;
RRC signaling carrying configuration information of the logical channel; and
RRC signaling carrying absolute time information.

In an embodiment, the method may further include the following operation.

The updated time-related information is sent to the terminal.

In the above scheduling process, when the granted radio resource is SPS or CG radio resource, the granted radio resources has the time of on duration and the time of suspended duration, so it is needed to consider the time information of the on duration and the suspended duration of the SPS or CG radio resource in the scheduling process.

Figure 2:
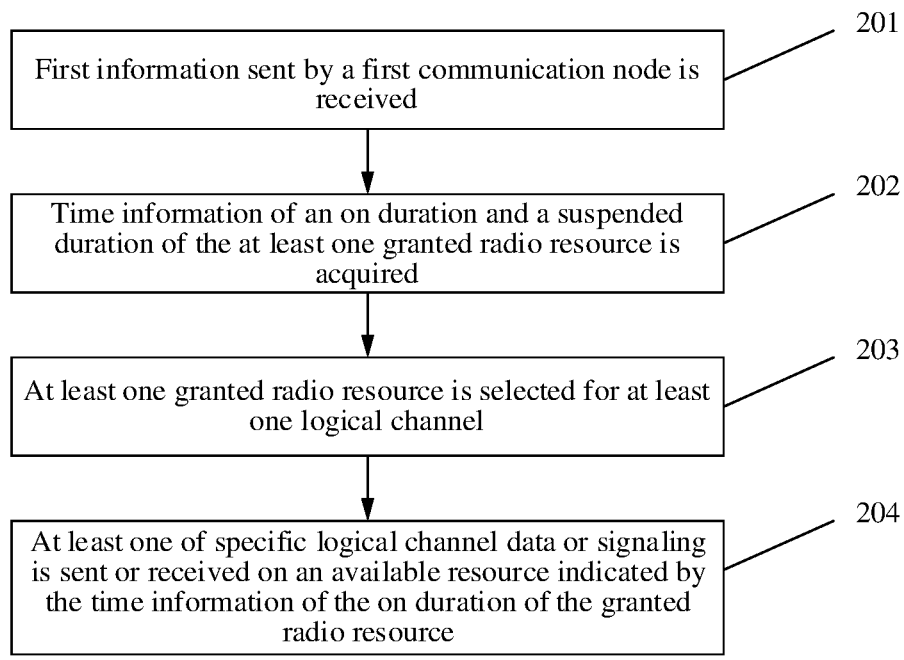
FIG. 2 is a flowchart of another scheduling method according to an embodiment of the disclosure.

Based on this, as shown in FIG. 2, an implementation mode of scheduling may include the following operations.

In 201, first information sent by the first communication node is received.

The first information includes at least one granted radio resource.

In 202, time information of an on duration and a suspended duration of the at least one granted radio resource is acquired.

In 203, at least one granted radio resource is selected for at least one logical channel.

In 204, at least one of specific logical channel data or signaling is sent or received on an available resource indicated by the time information of the on duration of the granted radio resource.

In practical applications, the specific implementation of the operation in 202 may include the following operation.

The time information of the on duration and the time information of the suspended duration of the corresponding granted radio resource configured through RRC dedicated signaling is received.

The specific implementation of the operation in 203 may include the following operation.

At least one granted radio resource is selected for the at least one logical channel based on at least one of the following information:
- time information of the service corresponding to the at least one logical channel;
- a logical channel selection result of the data packet cached by the at least one logical channel; or
- fourth information.

The fourth information represents at least one corresponding granted radio resource configured by each logical channel and/or a Radio Network Temporary Identifier (RNTI) configured by the at least one logical channel.

It is to be noted that the specific process of determining and updating the time information of the service corresponding to at least one logical channel has been described in detail above and will not be repeated here.

In 204, sending or reception of at least one of data or signaling on a resource indicated by the time information of the suspended duration of the granted radio resource is stopped.

In this way, the operation of the first communication node may include the following action.

The time information of the on duration and the time information of the suspended duration of the corresponding granted radio resource is configured for the terminal through the RRC dedicated signaling.

Another manner of scheduling is that: the terminal receives fifth information sent by the first communication node. The fifth information is the updated offset information of the granted SPS or CG radio resource.

The start position of the granted SPS or CG radio resource is updated using the fifth information.

When the period value in the time information of the service corresponding to the logical channel does not match the period value of the existing 5G network, for example, the period value in the time information of the service corresponding to the logical channel is not an integer divisor of the cycle period, namely 10240 ms, of a radio frame, after several SPS or CG periods (e.g., after the SFN warps around), a sending opportunity calculated based on the existing resources, namely the offset value, is inconsistent with the actual time point at which a service packet needs to be sent. The problem may be solved by updating the start position of the SPS or CG radio resource.

The fifth information sent by the first communication node is received through one of the following signaling: RRC signaling, an MAC CE or DCI.

In this way, the operation of the first communication node may include the following action.

The fifth information is sent to the terminal.

In an embodiment, the fifth information is sent to the terminal through one of the following signaling: RRC signaling, an MAC CE or DCI.

Based on the above scheduling solution, the embodiments of the disclosure also provide a scheduling method, which is applied to a terminal, and may include the following operations.

Configuration information of at least one set of configured grant that the first communication node configures for a used traffic pattern is received.

An offset sent by the first communication node is received.

An offset of a configured grant resource is updated with the received offset.

In an embodiment, the operation that the offset sent by the first communication node is received may include the following action.

The offset sent by the first communication node is received through DCI.

In practical applications, the configuration information of at least one set of configured grant that the first communication node configures for the used traffic pattern may be received through the RRC signaling. The configuration information includes the offset information of the configured grant resource.

Correspondingly, the embodiments of the disclosure also provide a scheduling method, which is applied to a first communication node. The method may include the following operations.

A traffic pattern used by the terminal is acquired.

For the used traffic pattern, at least one set of configured grant is configured for the terminal.

An offset is sent to the terminal, the offset sent being used for the terminal to update an offset of the configured grant resource.

In an embodiment, the operation that the traffic pattern used by the terminal is acquired may include one of the following:
- the traffic pattern used by the terminal is acquired from a core network; and
- the traffic pattern used by the terminal is acquired from the terminal.

In an embodiment, the operation that the offset is sent to the terminal may include the following action.

The offset is sent to the terminal through the DCI.

The embodiments of the disclosure provide an information transmission method, which is applied to a first communication node. The method may include the following operations.

Clock information is acquired.

m types of clock information are sent to a terminal based on the acquired clock information. m is greater than or equal to 1.

In an embodiment, the operation that the clock information is acquired may include at least one of the following:
- the clock information is acquired from a core network;
- the clock information is acquired from an adjacent communication node;
- the clock information sent by the terminal is received;
- capability information reported by the terminal is received, the capability information indicating clock related capability supported by the terminal; or
- the clock information is acquired from a specific network system (for example, the TSN system).

In an embodiment, the capability information includes at least one of the following:
- the clock type supported by the terminal; or
- at least one of the synchronization precision information or the synchronization granularity information supported by the terminal.

In an embodiment, the clock information sent by the terminal includes clock information of a system to which the terminal is being connected.

In an embodiment, the clock information includes at least one of the following:
- time information of the UTC;
- an offset between the UTC and the GPS;

information about the relationship between the DST and the local time;
an offset between the UTC and the local time;
an offset between the UTC and the specific network;
a mapping relationship between the UTC and the SFN;
indication information about whether the clock is the master clock;
level information of the clock;
information about an offset between the clock information and the reference time of the specific clock type;
synchronization precision information of the clock;
synchronization granularity information of the clock;
synchronization inaccuracy information;
type information of the clock;
reference time information;
position relationship indication information of the reference time information and the received signaling; or
time update period information of the clock.

In an embodiment, the reference time information includes at least one of the following:
reference system radio frame information;
reference subframe information;
reference slot information; or
reference time symbol information.

Correspondingly, the embodiments of the disclosure also provide an information transmission method. The method is applied to a terminal, and may include the following operations.

At least one of capability information or clock information is sent to the first communication node. The capability information indicates the clock related capability supported by the terminal.

The m types of clock information sent by the first communication node are received, where m is greater than or equal to 1.

With the solution provided by the embodiments of the disclosure, the terminal determines the time information of the service corresponding to at least one logical channel, receives the first information sent by the first communication node, the first information including the granted radio resource, and selects at least one logical channel for the granted radio resource based on the time information of the service corresponding to the at least one logical channel in combination with configuration parameters of the at least one logical channel. The logical channel is selected by using the time information of the service, which improves the accuracy of logical channel selection, and fully ensures the utilization ratio of radio resources and the performance of the terminal running services.

The disclosure is further described below in combination with application embodiments.

First Application Embodiment

In the application embodiment, the service is TSN service.

The process of selecting a logical channel in the application embodiment includes the following operations.

At the first step, after acquiring clock information of a TSN system, a base station broadcasts n (n being greater than or equal to 1) types of clock information through a system message.

In practical applications, the base station may receive the clock information of the TSN system sent by the core network and the adjacent base station, and may also directly obtain the clock information from the TSN system. The base station may also receive the clock information of the TSN system sent by UE 1.

The n types of clock information broadcast include, for example, the clock information of the TSN system 1, the clock information of the TSN system 2, the clock information of the TSN system 3 with a precision k, the clock information of the TSN system 3 with a precision 1, the clock information of the TSN system 3 with a precision z, the clock information obtained from the GNSS, the clock information of the GNSS with a precision m, and the clock information of the GNSS with a precision h.

At the second step, the UE2 reports capability information.

The capability information reported by the UE2 carries information about the clock type, synchronization precision and/or synchronization granularity supported by the UE2.

In practical applications, the UE 1 and the UE 2 may be the same UE or different UEs.

At the third step, a base station system sends m (m being greater than or equal to 1) types of clock information through an RRC dedicated message.

The m types of clock information may be determined as needed, and for example, include: the clock information of the TSN system 1, the clock information of the TSN system 2, the clock information of the TSN system 3 with a precision k, the clock information of the TSN system 3 with a precision 1, the clock information obtained from the GNSS, and the clock information obtained from the GNSS with a precision m.

The clock information may include at least one of the following information:
time information of UTC;
an offset between the UTC and the GPS ((number of leap seconds offset between GPS Time and UTC);
information about a relationship between DST and local time (if and how the DST is applied to obtain the local time);
an offset between the UTC and the local time;
an offset between the UTC and the TSN;
a mapping relationship between the UTC and the SFN;
indication information about whether the clock is the master clock;
level information of the clock;
the information about the offset between the clock information and a reference time of a specific clock type, the specific clock type may be a master clock or a currently applied clock or a clock type configured through signaling;
synchronization precision information of the clock;
synchronization granularity information of the clock;
synchronization inaccuracy information (inaccuracy indication);
type information of the clock, for example, the GNSS or the TSN; or
time update period information of the clock.

When using the resource of the SPS or CG, the UE 2 applies the corresponding clock of the SPS or CG configuration as the reference time.

The synchronization inaccuracy information indicates an inaccuracy range of time reference information. For example, if the inaccuracy indication is 3 μs (microseconds) and the time of the time reference information is k, then the UE 2 considers that the current time is (k−3 μs, k+3 μs).

At the same time, when configuring the logical channel, the base station configures one or more clock information types to indicate the clock types, such as a logistics network of TSN, the Internet of Vehicles, a GPS network, and a power network of TSN. That is, the RRC dedicated signaling is RRC signaling carrying the configuration information of the logical channel.

At the fourth step, the UE 2 receives and applies the configuration information of these clocks and services.

In practical applications, the UE 2 may acquire the clock information from a system message broadcast by the base station, and may also acquire the clock information from the RRC dedicated message sent by the base station, that is, the UE 2 may directly acquire the time information (clock information of the service corresponding to the logical channel) such as the corresponding time point from the system message or the dedicated message. In addition, in practical applications, the UE 2 may also acquire the clock information through one of the following signaling:
DCI of a UL grant;
DCI of DL scheduling;
RRC signaling carrying the grand information of the UL configuration;
a signaling carrying SPS information of the DL configuration;
RRC signaling carrying the configuration information of the logical channel; and
RRC signaling carrying the absolute time information.

In addition, in practical applications, the UE 2 may also receive the second information through one of the following signaling:
DCI of the UL grant;
DCI of the DL scheduling;
RRC signaling carrying the grand information of the UL configuration;
a signaling carrying the SPS information of the DL configuration; and
RRC signaling carrying the absolute time information.

The second information represents at least one of the following:
an indicated resource is aligned with a specific clock boundary or has the minimum offset from the specific clock boundary; or
the period of the indicated resource has a multiple relationship with the period of the specific clock, or a offset of the period value of the indicated resource is the minimum.

The time information of the service corresponding to the logical channel is determined using the second information, that is, the clock information of the service corresponding to the logical channel is implicitly inferred.

For example, the UE 2 implicitly infers the clock information of the service corresponding to the logical channel based on a certain clock the boundary of which is aligned with or has the minimum offset from the resource indicated by the UL grant.

In the process of multiplexing UL information, when performing the logical channel selection, the UE 2 not only considers the configuration parameters of logical information (such as the priority and numerology), but also considers the time information. That is, when there are data packets corresponding to one or more logical channels that newly arrive or need to be retransmitted in the cache of the UE 2, the UE 2 also needs to consider the clock information in addition to the priority and numerology of logical information during choosing to send the data packets on the resource of the UL grant or the SPS/CG. For example, when the priority of the logical channel 1 corresponding to the data packet 1 is lower than that of the logical channel 2 corresponding to the data packet 2, because the clock information indicated in DCI signaling is consistent with the clock information corresponding to the logical channel 1, the data packet 1 corresponding to the logical channel 1 is preferentially scheduled with this resource. For another example, when the priority of the logical channel 1 corresponding to the data packet 1 is the same as that of the logical channel 2 corresponding to the data packet 2, because the location of resource information in time indicated by the DCI signaling or SPS/CG is closer to the location of arrival time of the data packet 1 of the logical channel 1 (relative to the data packet 2), the data packet 1 corresponding to the logical channel 1 is preferentially scheduled with this resource.

Second Application Embodiment

In the application embodiment, the service is the TSN service.

The process of the present embodiment is basically the same as the process of selecting a logical channel in the first application embodiment. Different from the first application embodiment, the UE 2 directly obtains a reference time type from the RRC message (system message and/or dedicated message), and then calculates the information such as the corresponding time point or the like according to the offset information (namely the second information) between the reference time in the message and the reference time of a specific clock type, that is, acquires the clock information of the service corresponding to the logical channel That is, the time information of the service corresponding to the logical channel is determined using the second information, that is, the clock information of the service corresponding to the logical channel is implicitly inferred.

The UE 2 may also receive the second information through one of the following signaling:
DCI of a UL grant;
DCI of DL scheduling;
RRC signaling carrying grand information of the UL configuration;
a signaling carrying SPS information of the DL configuration; and
RRC signaling carrying absolute time information;

The second information represents at least one of the following:
an indicated resource is aligned with a specific clock boundary or has the minimum offset from the specific clock boundary; or
the period of the indicated resource has a multiple relationship with the period of the specific clock, or the offset of the period value of the indicated resource is the minimum.

For example, the UE 2 implicitly infers the clock information of the service corresponding to the logical channel based on a certain clock the boundary of which is aligned with or has the minimum offset from the resource indicated by the UL grant.

Third Application Embodiment

In the application embodiment, the service is the TSN service.

In the application embodiment, the process of updating the clock information is described based on the first application embodiment and the second application embodiment.

There is a timer at each of the base station side and the UE side, and the duration of the timer is time update period information of the clock. When the timer expires, the base station or UE triggers the process of updating the clock information, and the base station sends the updated time-related information to the UE.

The time-related information may include the updated clock information and/or the delta value of an offset between the time of the previous clock information and reference time of a specific clock type.

In practical applications, the time-related information may be sent to the UE through the RRC signaling or the MAC CE.

In practical applications, when the timer does not expire, the base station or the UE may also trigger the process of updating the clock information in advance, and the base station sends the updated time-related information to the UE, for example, in a scenario with a low delay requirement of UE.

Fourth Application Embodiment

In the application embodiment, the process that the UE uses the resource of the SPS or CG configuration to transmit data is described based on the first embodiment to the third embodiment.

When SPS/CG information is configured, the following operations may be included.

At the first step, the base station obtains a TSN traffic pattern from the core network or the UE, and configures one or more sets of configured grant for the UE through the RRC dedicated messages to support the corresponding TSN traffic pattern. The configuration information of the configured grant includes at least one of the following information:

a period;
an offset from SFN=0 in time domain;
a start symbol number in the time domain, a duration of available resources and a PUSCH mapping type;
resources allocated in frequency domain;
a Modulation and Coding Scheme (MCS) and a transport block size;
the time or symbol number of the on duration of the configured grant (namely the time information of the on duration); or
the time or symbol number of the suspended duration of the configured grant (namely the time information of the suspended duration).

At the second step, the UE receives and applies the configuration information of the configured grant.

Specifically, the UE directly obtains information such as the time (or symbol number) of the on duration and the time (or the symbol number) of the suspended duration of the configured grant from the RRC dedicated message. The time of the on duration and the time of the suspended duration form a configured grant cycle, as shown in FIG. 3.

Figure 3:
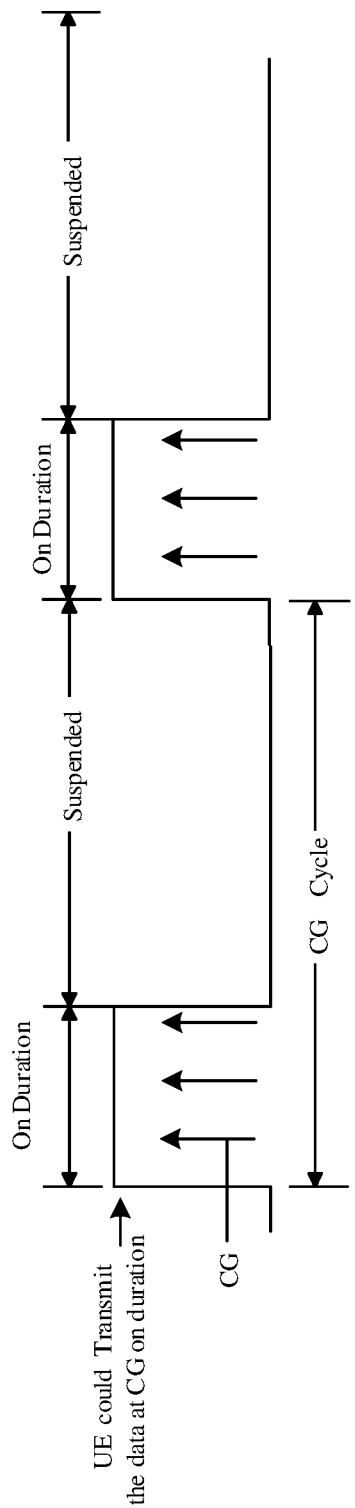
FIG. 3 is a schematic diagram of a scheduling process according to an embodiment of the disclosure.

As shown in FIG. 3, within the time (or symbol number) of the on duration of the configured grant, the UE may send data to be transmitted on time-frequency resources that the base station reserves for the configured grant. Within the time (or symbol number) of the suspended duration of the configured grant, the base station does not reserve the time-frequency resources for the configured grant, and the UE cannot use the time-frequency resources for the configured grant within the time. The configured grant may be reactivated or deactivated through the RRC dedicated signaling within both the time (symbol number) of the on duration and the time (symbol number) of the suspended duration of the configured grant. Of course, the UE may select, in a suspended state, the resource(s) of another configured grant to send the data to be transmitted.

Fifth Application Embodiment

In the application embodiment, the process that the UE uses the resource of the SPS or CG configuration to transmit data is described based on the first embodiment to the third embodiment.

When the SPS/CG information is configured, the following operations may be included.

At the first step, the base station obtains the TSN traffic pattern from the core network or the UE, and configures one or more sets of configured grant for the UE through the RRC dedicated message to support the corresponding TSN traffic pattern. The configuration information of the configured grant includes at least one of the following information:

a period;
an offset from SFN=0 in time domain;
a start symbol number in the time domain, a duration of available resources and a PUSCH mapping type;
resources allocated in frequency domain;
an MCS and a transport block size;
the time or symbol number of the on duration of the configured grant (namely the time information of the on duration); or
the time or symbol number of the suspended duration of the configured grant (namely the time information of the suspended duration).

Then, the base station updates the offset information of configured grant resource through DCI of a Physical Downlink Control Channel (PDCCH).

The problem that the period value in the time information of the service corresponding to the logical channel does not match the period value of the existing 5G network may be solved by updating the start position of the SPS or CG radio resource.

In practical applications, the base station may update the offset information of configured grant resource through the DCI of the PDCCH.

Figure 4:
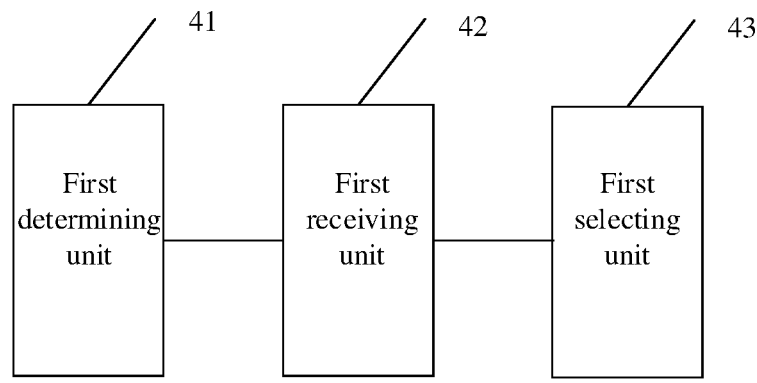
FIG. 4 is a structural schematic diagram of a scheduling apparatus according to an embodiment of the disclosure.

In order to implement the method for the terminal side of the embodiments of the disclosure, the embodiments of the disclosure provide a scheduling apparatus, which is arranged on the terminal. As shown in FIG. 4, the apparatus may include a first determining unit 41, a first receiving unit 42 and a first selecting unit 43.

The first determining unit 41 is configured to determine time information of a service corresponding to at least one logical channel.

The first receiving unit 42 is configured to receive first information sent by a first communication node. The first information includes a granted radio resource.

The first selecting unit 43 is configured to select at least one logical channel for the granted radio resource based on the time information of the service corresponding to the at least one logical channel and configuration parameters of the at least one logical channel.

In an embodiment, the first determining unit 41 is further configured to update the time information of the service corresponding to the at least one logical channel.

In practical applications, the first determining unit 41 may be implemented by a processor in the scheduling apparatus in combination with a communication interface. The first receiving unit 42 may be implemented by the communication interface in the scheduling apparatus. The first selecting unit 43 may be implemented by the processor in the scheduling apparatus.

In order to implement the method for the first communication node of the embodiments of the disclosure, the embodiments of the disclosure provide an information transmission apparatus, which is arranged on the communication node. The apparatus may include a first sending unit.

The first sending unit is configured to: send time information of a service corresponding to a corresponding logical channel to a terminal; or, send second information to the terminal.

The second information represents at least one of the following:
  an indicated resource is aligned with a specific clock boundary or has the minimum offset from the specific clock boundary; or
  a period of the indicated resource has a multiple relationship with a period of the specific clock, or an offset of the period value of the indicated resource is the minimum.

In practical applications, the first sending unit may be implemented by a processor in the information transmission apparatus in combination with a communication interface.

Figure 5:
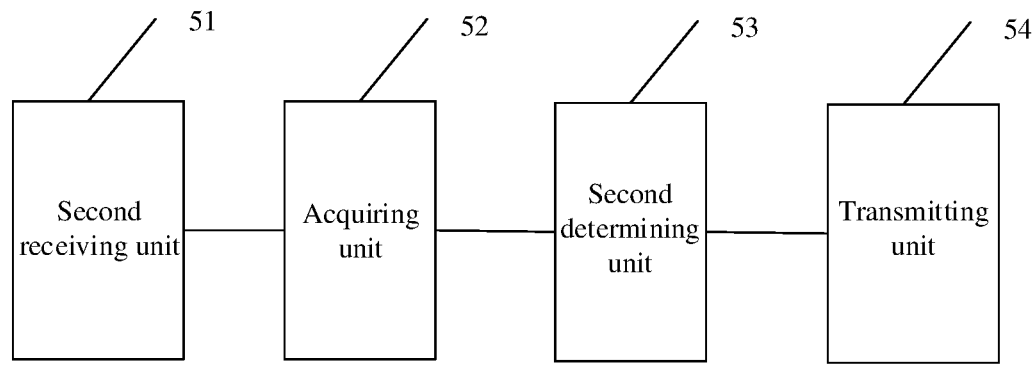
FIG. 5 is a structural schematic diagram of another scheduling apparatus according to an embodiment of the disclosure.

In order to implement the method for the terminal side of the embodiments of the disclosure, the embodiments of the disclosure provide a scheduling apparatus, which is arranged on the terminal. As shown in FIG. 5, the apparatus may include a second receiving unit 51, an acquiring unit 52, a second determining unit 53 and a transmitting unit 54.

The second receiving unit 51 is configured to receive first information sent by a first communication node, the first information including at least one granted radio resource.

The acquiring unit 52 is configured to acquire time information of an on duration and a suspended duration of the at least one granted radio resource.

The second determining unit 53 is configured to select at least one granted radio resource for at least one logical channel.

The transmitting unit 54 is configured to send or receive at least one of specific logical channel data or signaling on the available resource indicated by the time information of the on duration of the granted radio resource.

In an embodiment, the second determining unit 53 is configured to select at least one granted radio resource for at least one logical channel based on at least one of the following information:
  time information of a service corresponding to the at least one logical channel; a logical channel selection result of a data packet cached by the at least one logical channel; or the fourth information.

The fourth information represents at least one corresponding granted radio resource configured by each logical channel and/or RNTI configured by the at least one logical channel.

The transmitting unit 54 is further configured to stop sending or receiving at least one of data or signaling on the resource indicated by the time information of the suspended duration of the granted radio resource.

In practical applications, the second receiving unit 51 may be implemented by a communication interface in the scheduling apparatus. The acquiring unit 51 and the transmitting unit 54 may be implemented by a processor in the scheduling apparatus in combination with the communication interface. The second determining unit may be implemented by the processor in the scheduling apparatus.

In order to implement the method for the first communication node side, the embodiments of the disclosure provide an information transmission apparatus, which is arranged on the first communication node. The apparatus may include a second sending unit.

The second sending unit is configured to configure time information of an on duration and time information of a suspended duration of the corresponding granted radio resource for a terminal through RRC dedicated signaling.

In practical applications, the second sending unit may be implemented by a processor in the information transmission apparatus in combination with a communication interface.

In order to implement the method of the embodiments of the disclosure, the embodiments of the disclosure also provide a scheduling apparatus, which is arranged on the terminal. The apparatus may include a third receiving unit and a processing unit.

The third receiving unit is configured to receive configuration information of at least one set of configured grant that a first communication node configures for a used traffic pattern, and receive an offset sent by the first communication node.

The processing unit is configured to update the offset of the configured grant resource with the received offset.

In an embodiment, the third receiving unit is configured to receive the offset sent by the first communication node through DCI.

In practical applications, the third receiving unit may be implemented by a communication interface in the scheduling apparatus, and the processing unit may be implemented by a processor in the scheduling apparatus.

In order to implement the method of the embodiments of the disclosure, the embodiments of the disclosure also provide a scheduling method, which is arranged on the first communication node. The apparatus may include a first acquiring unit, a configuring unit and an updating unit.

The first acquiring unit is configured to acquire a traffic pattern used by a terminal.

The configuring unit is configured to configure for the terminal at least one set of configured grant for the used traffic pattern.

The updating unit is configured to send an offset to the terminal. The sent offset is used for the terminal to update an offset of the configured grant resource.

In an embodiment, the first acquiring unit is configured to perform one of the following operations:
  acquiring the traffic pattern used by the terminal from the core network; or
  acquiring the traffic pattern used by the terminal from the terminal.

In an embodiment, the updating unit is configured to:
  send the offset to the terminal through DCI.

In practical applications, the first acquiring unit and the updating unit may be implemented by the communication interface in the scheduling apparatus, and the configuring unit may be implemented by the communication interface in the scheduling apparatus in combination with a processor.

In order to implement the method of the embodiments of the disclosure, the embodiments of the disclosure also provide an information transmission apparatus, which is arranged on a first communication node. The apparatus may include a second acquiring unit and a third sending unit.

The second acquiring unit is configured to acquire clock information.

The third sending unit is configured to send m types of clock information to a terminal based on the acquired clock information, where m is greater than or equal to 1.

In an embodiment, the second acquiring unit is configured to perform at least one of the following operations:

acquiring the clock information from a core network;
acquiring the clock information from an adjacent communication node; or
receiving the clock information sent by the terminal;
receiving capability information reported by the terminal, the capability information indicating clock related capability supported by the terminal; or
acquiring the clock information from a specific network system.

In practical applications, the second acquiring unit may be implemented by a communication interface in the information transmission apparatus, and the third sending unit may be implemented by the communication interface in the information transmission apparatus in combination with a processor.

In order to implement the method of the embodiments of the disclosure, the embodiments of the disclosure also provide an information transmission apparatus, which is arranged on a terminal. The apparatus may include a fourth sending unit and a fourth receiving unit.

The fourth sending unit is configured to send at least one of capability information or clock information to a first communication node, the capability information indicating clock related capability supported by the terminal.

The fourth receiving unit is configured to receive m types of clock information sent by the first communication node, where m is greater than or equal to 1.

In practical applications, the fourth sending unit and the fourth receiving unit may be implemented by the communication interface in the information transmission apparatus.

It is to be noted that when the scheduling apparatus provided by the embodiments performs the scheduling processing, the apparatus is illustrated only by the division of program modules mentioned above. In practical applications, the above processing may be assigned to different program modules to complete as needed, that is, the internal structure of the apparatus is divided into different program modules to complete all or part of the processing described above. In addition, the scheduling apparatus provided in the embodiments belongs to the same concept as the scheduling method embodiments, and details about a specific implementation process thereof refer to the method embodiments, which will not be elaborated herein. Correspondingly, when the information transmission apparatus provided by the embodiments performs information transmission, the apparatus is illustrated only by the division of program modules mentioned above. In practical applications, the above processing may be assigned to different program modules to complete as needed, that is, the internal structure of the apparatus is divided into different program modules to complete all or part of the processing described above. In addition, the information transmission apparatus provided in the embodiments belongs to the same concept as the information transmission method embodiments, and details about a specific implementation process thereof refer to the method embodiments, which will not be elaborated herein.

Figure 6:
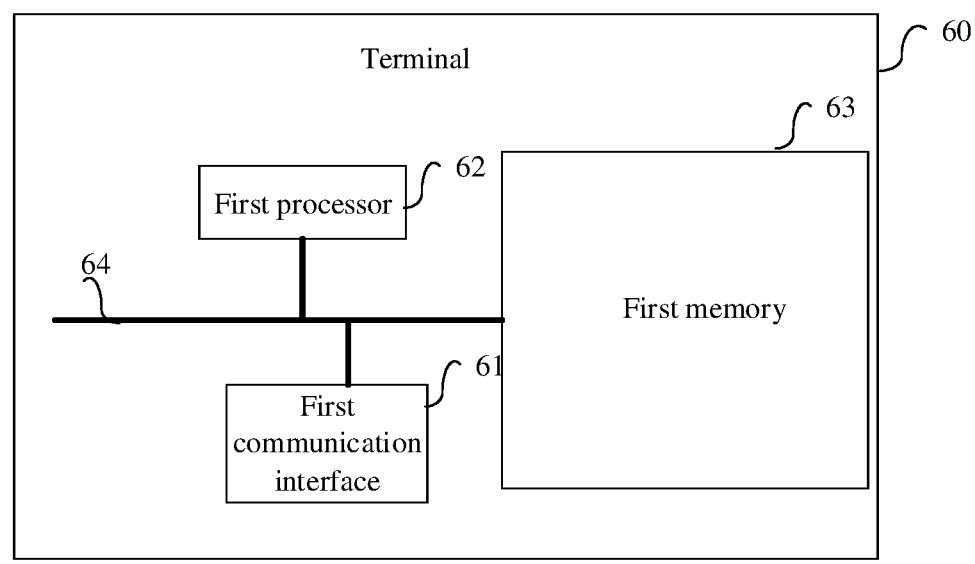
FIG. 6 is a structural schematic diagram of a terminal according to an embodiment of the disclosure.

Based on hardware implementation of the above program modules, for implementing the method for the terminal side in the embodiments of the disclosure, the embodiments of the disclosure provide a terminal. As shown in FIG. 6, the terminal 60 includes a first communication interface 61, a first processor 62 and a first memory 63.

The first communication interface 61 may perform information interaction with a first communication node.

The first processor 62 is connected with the first communication interface 61 to implement information interaction with the first communication node, and is configured to run a computer program to execute the method provided in one or more technical solutions for the terminal side. The computer program is stored in the first memory 63.

Specifically, when the process shown in FIG. 1 is implemented, the first processor 62 is configured to determine time information of a service corresponding to at least one logical channel.

The first communication interface 61 is configured to receive first information sent by the first communication node, the first information including a granted radio resource.

The first processor 62 is further configured to select at least one logical channel for the granted radio resource based on the time information of the service corresponding to the at least one logical channel and configuration parameters of the at least one logical channel.

In an embodiment, the first processor 62 is further configured to update the time information of the service corresponding to the at least one logical channel.

When the process shown in FIG. 2 is implemented, the first communication interface 61 is configured to receive first information sent by the first communication node, the first information including at least one granted radio resource.

The first processor 62 is configured to acquire time information of an on duration and a suspended duration of the at least one granted radio resource, and select at least one granted radio resource for at least one logical channel.

The first communication interface 61 is further configured to send or receive at least one of specific logical channel data or signaling on the available resource indicated by the time information of the on duration of the granted radio resource.

In an embodiment, the first processor 62 is configured to select at least one granted radio resource for at least one logical channel based on at least one of the following information:
time information of a service corresponding to the at least one logical channel; a logical channel selection result of a data packet cached by the at least one logical channel; or the fourth information.

The fourth information represents at least one corresponding granted radio resource configured by each logical channel and/or RNTI configured by the at least one logical channel.

The first communication interface 61 is further configured to stop sending or receiving at least one of data or signaling on the resource indicated by the time information of the suspended duration of the granted radio resource.

In the embodiments of the disclosure, the first communication interface 61 is configured to receive configuration information of at least one set of configured grant that the first communication node configures for the used traffic pattern, and receive an offset sent by the first communication node. The first processor 62 is configured to update the offset of the configured grant resource with the received offset.

Or,
the first communication interface 61 is configured to send at least one of capability information or clock information to the first communication node, the capability information indicating clock related capability supported by the terminal, and receive m types of clock information sent by the first communication node, where m is greater than or equal to 1.

In an embodiment, the first communication interface 61 is configured to receive the offset sent by the first communication node through DCI.

It is to be noted that the specific processing of the first processor 62 and the first communication interface 61 may be understood with reference to the above method.

In practical applications, various components in the terminal 60 are coupled together through a bus system 64. It may be understood that the bus system 64 is configured to implement connection communication between these components. The bus system 64 includes a data bus and further includes a power bus, a control bus and a state signal bus. However, for clear description, various buses in FIG. 6 are marked as the bus system 64.

The first memory 63 in the embodiments of the disclosure is configured to store various types of data to support the operations of the terminal 60. Examples of the data include any computer program operated in the terminal 60.

The method disclosed in the embodiments of the disclosure may be applied to the first processor 62 or implemented by the first processor 62. The first processor 62 may be an integrated circuit chip with a signal processing capability. In an implementation process, the operations of the method may be accomplished by an integrated logic circuit of hardware in the first processor 62 or an instruction in a software form. The first processor 62 may be a universal processor, a Digital Signal Processor (DSP) or another Programmable Logic Device (PLD), a discrete gate or transistor logic device, a discrete hardware component, etc. The first processor 62 may implement or execute each method, operation and logical block diagram disclosed in the embodiments of the disclosure. The universal processor may be a microprocessor, any conventional processor or the like. The operations of the method disclosed in combination with the embodiments of the disclosure may be directly embodied to be executed and completed by a hardware decoding processor or executed and completed by a combination of hardware and software modules in the decoding processor. The software module may be located in a storage medium, and the storage medium is located in the first memory 63. The first processor 62 reads information in the first memory 63 and completes the operations of the method in combination with hardware.

In an exemplary embodiment, the terminal 60 may be implemented by one or more Application Specific Integrated Circuits (ASICs), DSPs, Programmable Logic Devices (PLDs), Complex Programmable Logic Devices (CPLDs), Field-Programmable Gate Array (FPGAs), universal processors, controllers, Micro Controller Units (MCUs), microprocessors, or other electronic components, and is configured to execute the above methods.

Figure 7:
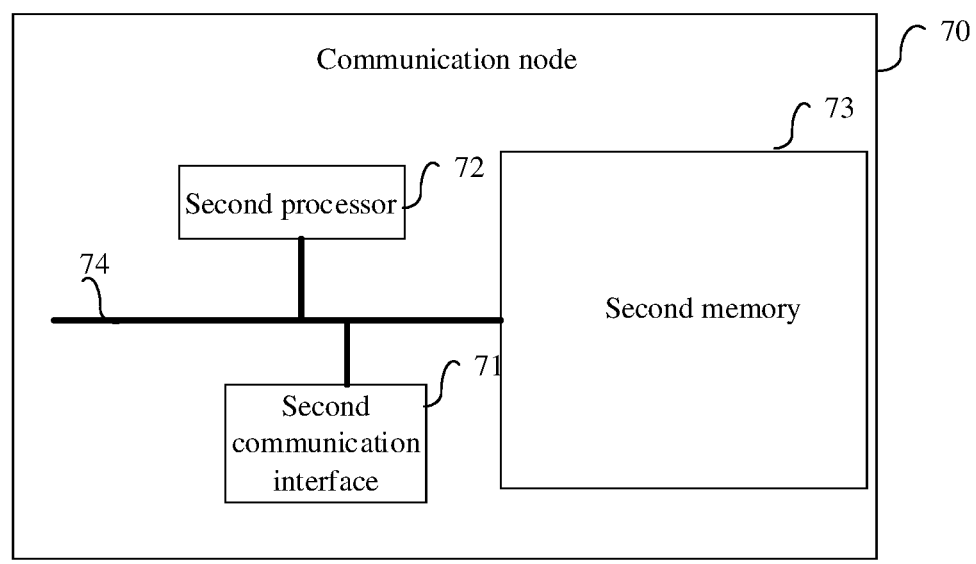
FIG. 7 is a structural schematic diagram of a communication node according to an embodiment of the disclosure.

Based on the hardware implementation of each program module, for implementing the method for the first communication node side in the embodiments of the disclosure, the embodiments of the disclosure provide a communication node. As shown in FIG. 7, the communication node 70 includes a second communication interface 71, a second processor 72 and a second memory 73.

The second communication interface 71 may perform information interaction with a network device.

The second processor 72 is connected with the second communication interface 71 to implement information interaction with a terminal, and is configured to run a computer program to execute the method provided in one or more technical solutions for the first communication node side. The computer program is stored in the second memory 73.

Specifically, when the process shown in FIG. 1 is implemented, the second communication interface 71 is configured to send time information of a service corresponding to a corresponding logical channel to a terminal under control of the second processor 72; or, send second information to the terminal under the control of the second processor.

The second information represents at least one of the following:
an indicated resource is aligned with a specific clock boundary or has the minimum offset from the specific clock boundary; or
the period of the indicated resource has a multiple relationship with the period of the specific clock, or the offset of the period value of the indicated resource is the minimum.

When the process shown in FIG. 2 is implemented, the second processor 72 is configured to configure, by using the second communication interface 71, time information of an on duration and time information of a suspended duration of the corresponding granted radio resource for the terminal through RRC dedicated signaling.

In the embodiments of the disclosure, the second processor 72 is configured to acquire a traffic pattern used by the terminal, and configure for the terminal at least one set of configured grant for the used traffic pattern through the second communication interface 71. The second communication interface 71 is configured to send the offset to the terminal. The sent offset is used for the terminal to update the offset of the configured grant resource.

Or, the second communication interface 71 is configured to acquire clock information, and send m types of clock information to the terminal based on the acquired clock information, where m is greater than or equal to 1.

In an embodiment, the second communication interface 71 is configured to perform one of the following operations:
acquiring the traffic pattern used by the terminal from the core network; or
acquiring the traffic pattern used by the terminal from the terminal.

In an embodiment, the second communication interface 71 is configured to send the offset to the terminal through DCI.

In an embodiment, the second communication interface 71 is configured to perform at least one of the following operations:
acquiring the clock information from the core network;
acquiring the clock information from an adjacent communication node;
receiving the clock information sent by the terminal;
receiving capability information reported by the terminal, the capability information indicating clock related capability supported by the terminal; or
acquiring the clock information from the specific network system.

It is to be noted that the specific processing of the second processor 71 and the second communication interface 71 may be understood with reference to the above method.

In practical applications, various components in the communication node 70 are coupled through the bus system 74. It may be understood that the bus system 74 is configured to implement connection communication between these components. The bus system 74 includes a data bus and further includes a power bus, a control bus and a state signal bus. However, for clear description, various buses in FIG. 7 are marked as the bus system 74.

The second memory 73 in the embodiments of the disclosure is configured to store various types of data to support the operations of the communication node 70. Examples of the data include any computer program operated on the communication node 70.

The method disclosed in the embodiments of the disclosure may be applied to the second processor 72 or implemented by the second processor 72. The second processor 72 may be an integrated circuit chip with a signal processing capability. In an implementation process, the operations of the method may be accomplished by an integrated logic circuit of hardware in the second processor 72 or an instruction in a software form. The second processor 72 may be a universal processor, a DSP or other PLD, a discrete gate or transistor logic device, a discrete hardware component, etc. The second processor 72 may implement or execute each method, operation and logical block diagram disclosed in the embodiments of the disclosure. The universal processor may be a microprocessor, any conventional processor or the like. The operations of the method disclosed in combination with the embodiments of the disclosure may be directly embodied to be executed and completed by a hardware decoding processor or executed and completed by a combination of hardware and software modules in the decoding processor. The software module may be located in a storage medium, and the storage medium is located in the second memory 73. The second processor 72 reads information in the second memory 73 and completes the operations of the method in combination with hardware.

In an exemplary embodiment, the communication node 70 may be implemented by one or more ASICs, DSPs, PLDs, CPLDs, FPGAs, universal processors, controllers, MCUs, microprocessors, or other electronic components, and is configured to execute the above methods.

It is to be understood that the each of memories (the first memory 63 and the second memory 73) in the embodiments of the disclosure may be a volatile memory or a nonvolatile memory, or may include both the volatile and nonvolatile memories. The nonvolatile memory may be a Read Only Memory (ROM), a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a flash memory, a magnetic surface memory, an optical disc, or a Compact Disc Read-Only Memory (CD-ROM). The magnetic surface memory may be a disk memory or a tape memory. The volatile memory may be a Random Access Memory (RAM), and is used as an external high-speed cache. It is exemplarily but unlimitedly described that RAMs in various forms may be adopted, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM) and a Direct Rambus Random Access Memory (DRRAM). The memory described in the embodiments of the disclosure is intended to include, but not limited to, memories of these and any other proper types.

In an exemplary embodiment, the embodiments of the disclosure also provide a storage medium, namely a computer storage medium, specifically a computer-readable storage medium, which includes, for example, the first memory 63 storing a computer program. The computer program may be executed by the first processor 62 of the terminal 60 to complete the operations of the method for the terminal side. For another example, the storage medium includes the second memory 73 storing a computer program. The computer program may be executed by the second processor 72 of the communication node 70 to complete the operations of the method for the first communication node side. The computer-readable storage medium may be a memory such as an FRAM, a ROM, a PROM, an EPROM, an EEPROM, a flash memory, a magnetic surface memory, an optical disc, or a CD-ROM.

It is to be noted that terms "first", "second" and the like are adopted to distinguish similar objects and not intended to describe a specific sequence or order.

In addition, the technical solutions recorded in the embodiments of the disclosure may be freely combined without conflicts.

The above is only the preferred embodiments of the disclosure and not intended to limit the protection scope of the disclosure.

The invention claimed is:

1. An information transmission method, applied to a first communication node, the method comprising:
  acquiring capability information reported by a terminal, the capability information indicating clock related capability supported by the terminal; and
  sending m types of clock information to the terminal based on the capability information, m being greater than or equal to 1, wherein the m types of clock information comprise synchronization inaccuracy information indicating an inaccuracy value of reference time information.

2. The method of claim 1, further comprising: acquiring clock information,
  wherein acquiring the clock information comprises at least one of the following:
    acquiring the clock information from a core network;
    acquiring the clock information from an adjacent communication node;
    receiving the clock information sent by the terminal; or
    acquiring the clock information from a specific network system.

3. The method of claim 1, wherein the capability information comprises at least one of the following:
  a clock type supported by the terminal; or
  at least one of synchronization precision information or synchronization granularity information supported by the terminal.

4. The method of claim 2, wherein the clock information sent by the terminal comprises:
  clock information of a system to which the terminal is being connected.

5. The method of claim 1, wherein the m types of clock information further comprise at least one of the following:
  time information of Universal Time Coordinated (UTC);
  an offset between the UTC and Global Positioning System (GPS);
  information about a relationship between Daylight Saving Time (DST) and local time;
  an offset between the UTC and the local time;
  an offset between the UTC and a specific network;
  a mapping relationship between the UTC and a System Frame Number (SFN);
  indication information about whether a clock corresponding to the m types of clock information is a master clock;
  level information of the clock;
  information about an offset with respect to a reference time of a specific clock type;
  synchronization precision information of the clock;
  synchronization granularity information of the clock;
  type information of the clock;

the reference time information;
position relationship indication information of the reference time information and a received signaling; or
time update period information of the clock.

6. The method of claim 5, wherein the reference time information comprises at least one of the following:
reference system radio frame information;
reference subframe information;
reference slot information; or
reference time symbol information.

7. An information transmission method, applied to a terminal, the method comprising:
sending capability information to a first communication node, the capability information indicating clock related capability supported by the terminal; and
receiving m types of clock information sent by the first communication node based on the capability information, m being greater than or equal to 1, wherein the m types of clock information comprise synchronization inaccuracy information indicating an inaccuracy value of reference time information.

8. The method of claim 7, wherein the capability information comprises at least one of the following:
a clock type supported by the terminal; or
at least one of synchronization precision information or synchronization granularity information supported by the terminal.

9. The method of claim 7, further comprising: sending clock information to the first communication node, wherein the clock information comprises:
clock information of a system to which the terminal is being connected.

10. The method of claim 7, wherein the m types of clock information further comprise at least one of the following:
time information of Universal Time Coordinated (UTC);
an offset between the UTC and Global Positioning System (GPS);
information about a relationship between Daylight Saving Time (DST) and local time;
an offset between the UTC and the local time;
an offset between the UTC and a specific network;
a mapping relationship between the UTC and a System Frame Number (SFN);
indication information about whether a clock corresponding to the m types of clock information is a master clock;
level information of the clock;
information about an offset with respect to a reference time of a specific clock type;
synchronization precision information of the clock;
synchronization granularity information of the clock;
type information of the clock;
the reference time information;
position relationship indication information of the reference time information and a received signaling; or
time update period information of the clock.

11. The method of claim 10, wherein the reference time information comprises at least one of the following:
reference system radio frame information;
reference subframe information;
reference slot information; or
reference time symbol information.

12. A communication node, comprising: a second communication interface, configured to implement the method of claim 1.

13. The communication node of claim 12, wherein the second communication interface is configured to acquire clock information through at least one of the following:
acquiring the clock information from a core network;
acquiring the clock information from an adjacent communication node;
receiving the clock information sent by the terminal; or
acquiring the clock information from a specific network system.

14. The communication node of claim 12, wherein the capability information comprises at least one of the following:
a clock type supported by the terminal; or
at least one of synchronization precision information or synchronization granularity information supported by the terminal.

15. The communication node of claim 13, wherein the m types of clock information further comprise at least one of the following:
time information of Universal Time Coordinated (UTC);
an offset between the UTC and Global Positioning System (GPS);
information about a relationship between Daylight Saving Time (DST) and local time;
an offset between the UTC and the local time;
an offset between the UTC and a specific network;
a mapping relationship between the UTC and a System Frame Number (SFN);
indication information about whether a clock corresponding to the m types of clock information is a master clock;
level information of the clock;
information about an offset with respect to a reference time of a specific clock type;
synchronization precision information of the clock;
synchronization granularity information of the clock;
type information of the clock;
the reference time information;
position relationship indication information of the reference time information and a received signaling; or
time update period information of the clock.

16. The communication node of claim 15, wherein the reference time information comprises at least one of the following:
reference system radio frame information;
reference subframe information;
reference slot information; or
reference time symbol information.

17. A terminal, comprising: a first communication interface, configured to send capability information to a first communication node, the capability information indicating clock related capability supported by the terminal, and receive m types of clock information sent by the first communication node based on the capability information, m being greater than or equal to 1, wherein the m types of clock information comprise synchronization inaccuracy information indicating an inaccuracy value of reference time information.

18. The terminal of claim 17, wherein the capability information comprises at least one of the following:
a clock type supported by the terminal; or
at least one of synchronization precision information or synchronization granularity information supported by the terminal.

19. The terminal of claim 17, wherein the m types of clock information further comprise at least one of the following:
time information of Universal Time Coordinated (UTC);

an offset between the UTC and Global Positioning System (GPS);
information about a relationship between Daylight Saving Time (DST) and local time;
an offset between the UTC and the local time;
an offset between the UTC and a specific network;
a mapping relationship between the UTC and a System Frame Number (SFN);
indication information about whether a clock corresponding to the m types of clock information is a master clock;
level information of the clock;
information about an offset with respect to a reference time of a specific clock type;
synchronization precision information of the clock;
synchronization granularity information of the clock;
type information of the clock;
the reference time information;
position relationship indication information of the reference time information and a received signaling; or
time update period information of the clock.

20. The terminal of claim 19, wherein the reference time information comprises at least one of the following:
reference system radio frame information;
reference subframe information;
reference slot information; or
reference time symbol information.

* * * * *